United States Patent

[11] 3,628,993

| [72] | Inventors | Ronald E. Gilbert<br>Shawnee Mission;<br>Bert H. Clampitt, Overland Park, both of Kans. |
|---|---|---|
| [21] | Appl. No. | 831,198 |
| [22] | Filed | June 6, 1969 |
| [45] | Patented | Dec. 21, 1971 |
| [73] | Assignee | Gulf Research & Development Company<br>Pittsburgh, Pa. |

[54] THERMALLY STABILIZED POLYAMIDE BY COATING PARTICLES WITH A CUPRIC SALT OF A COPOLYMER OF ETHYLENE WITH AN UNSATURATED MONOCARBOXYLIC ACID AND ESTER
5 Claims, No Drawings

[52] U.S. Cl. .................................................. 117/100 C,
117/138.8 N, 117/161 UH, 117/161 UC,
260/45.75 C, 260/78 SC, 260/857 R

[51] Int. Cl. .................................................. B32h 27/08,
C08q 1/62

[50] Field of Search ............................................. 117/100 C,
138.8 N, 161 UH, 161 UC; 260/45.75 C, 78 SC,
857 R

[56] References Cited
UNITED STATES PATENTS

| 2,948,698 | 8/1960 | Cocci ........................... | 117/100 X |
| 3,275,594 | 9/1966 | Bond ........................... | 260/45.75 |
| 3,365,403 | 1/1968 | Szczepanek et al. ......... | 260/45.75 X |
| 3,485,785 | 12/1969 | Anspon et al. ................ | 260/45.75 X |

*Primary Examiner*—William D. Martin
*Assistant Examiner*—Mathew R. P. Perrone, Jr.
*Attorneys*—Richard L. Kelly, Carl A. Cline, Forrest D. Stine and Richard A. Anderson

ABSTRACT: Discrete solid particles of polyamide are coated with a cupric salt of a carboxy-substituted olefin polymer in amounts of from about 0.1 percent to about 3.7 percent by weight to protect the polyamides from degradation during melt forming into manufactured articles.

3,628,993

THERMALLY STABILIZED POLYAMIDE BY COATING PARTICLES WITH A CUPRIC SALT OF A COPOLYMER OF ETHYLENE WITH AN UNSATURATED MONOCARBOXYLIC ACID AND ESTER

BACKGROUND OF INVENTION

This invention relates to stabilization of linear polyamides against degradation at elevated temperatures.

It is known to use copper salts to stabilize polyamides against thermal degradation in U.S. Pat. No. 3,275,594. It is also known to use copper salts in combination with potassium or cesium bromide salts. The copper salt of ethylene copolymer used in this invention is taught in copending application Ser. No. 716,982, filed Mar. 28, 2968 now U.S. Pat. No. 3,485,785.

SUMMARY

The method and composition of this invention are accomplished by coating unprocessed polyamide particles with a stabilizing amount of a cupric salt of a copolymer of an olefin with an unsaturated monocarboxylic acid which may also contain ester groups. The method protects the polyamide from thermal degradation resulting from excess temperature or a combination of temperature and residence time during melt process. This method and composition are as efficient or better than prior art method and offer an effective alternative to prior art methods.

PREFERRED EMBODIMENTS

Copper compounds of this invention were evaluated by using them in conjunction with potassium bromide. This mixture was used as replacement for the copper acetate-cesium bromide heat stabilizer of the prior art. Beginning with an ethylene-methyl acrylate copolymer containing 20 percent methyl acrylate by weight and having a metal index 20, the copper salt of the copolymer was prepared according to the method given in copending application Ser. No. 716,982 filed Mar. 28, 1968 so that of the original ester groups 65 groups per 100 groups were converted to the amide and 35 ester groups per 100 groups were converted to the copper salt. No acid or amide groups were present in this copolymer. Eight experimental heat stabilized samples were prepared in conjunction with potassium bromide. Then heat stability specimens were molded from the eight experimental resins and a control resin containing the copper acetate-cesium bromide heat stabilizer. The heat stability characteristic of the experimental resins were evaluated by heat aging the molded specimens in an air circulating oven at 160° C. and then periodically subjecting the specimen to a heat stability bend test. The heat stability results of the experimental samples were compared with the heat stability of the results on the controlled polyamide resins, which were heat stabilized with the copper acetate-cesium bromide system exhibiting very good heat stability characteristics.

Table I shows the percentages of the components used to manufacture each of the eight experimental heat stabilized resins. The following procedure was used in the manufacture of each of the eight experimental resins:
A. added the potassium bromide solution to the dry polyamide chips and rotated in a blending jar until the ships were surface dry.
B. Added copper complex emulsion to chips and rotated in blending jar until the chips were surface dried.
C. Dried the material for 24 hours under vacuum at 100° C.

MOLDING OF HEAT STABILITY

Test Specimen

Heat stability test specimens were molded from the eight experimental resins and the control resin. Dimensions of the test specimen were 4.5 inches by 0.250 inches by 0.062 inches. All samples were molded at the same molding conditions. Table II shows the conditions used to mold the test specimens.

HEAT STABILITY CHARACTERISTICS

The criteria used for judging the heat stability characteristics of the experimental resins was the heat stability bend test. In this test the specimens are placed in an air circulating oven which is maintained at a temperature of 160° C. The specimens are then removed from the oven periodically and subjected to the bend test. Prior to performing the bend test the specimens are allowed to cool to ambient room temperature for 30 minutes. The specimens are then bent 180° in one direction and then 360° in the opposite direction. Any type of fracture constitutes a failure of the specimen. Table III shows the results of the heat stability bend test. In Table III it can be noted that the bend test indicates that samples No. 3, 4, 7 and 8 have heat stability characteristics which are equal to or better than the heat stability characteristics of the control sample. Samples No. 7 and No. 8 exhibited the best heat stability characteristics. It can be noted that increasing concentration of potassium bromide over the 0.30 percent did not improve the heat stability characteristics. The heat stability bend test indicated that increasing the copper complex emulsion percentage did improve the heat stability characteristics of the resins.

Since it has previously been found that the copper acetate-potassium bromide heat stabilizer system is inferior to the copper acetate-cesium bromide system, the system of this invention makes possible the use of potassium bromide as a heat stabilizer.

In blending the two solutions with dry nylon, the maximum total percent solution that can be used was approximately 3.7 percent based on the chip weight. Higher percentages required an excessive amount of blending time to obtain surface dried chips. It is not feasible to increase the percent copper solution above 3.21 percent because this necessitates an excessive amount of blending time to obtain surface dried chips.

TABLE I.—HEAT STABILITY SYSTEMS WITH VARIABLE COPPER COMPLEX CONCENTRATIONS AND VARIABLE POTASSIUM BROMIDE CONCENTRATIONS

| | Milliliters Cu solution | Percent Cu solution | Grams KBr | Percent— | | |
|---|---|---|---|---|---|---|
| | | | | KBr | H₂O | H₂O |
| Sample No.: | | | | | | |
| 1 | 12.15 | 1.07 | 1.70 | 0.15 | 11.35 | 1.0 |
| 2 | 12.15 | 1.07 | 11.35 | 1.00 | 22.7 | 2.0 |
| 3 | 36.5 | 3.21 | 1.70 | 0.15 | 6.0 | 0.5 |
| 4 | 24.3 | 2.14 | 3.40 | 0.30 | 11.35 | 1.0 |
| 5 | 12.15 | 1.07 | 1.70 | 0.15 | 11.35 | 1.0 |
| 6 | 12.15 | 1.07 | 11.35 | 1.00 | 22.7 | 2.0 |
| 7 | 36.5 | 3.21 | 1.70 | 0.15 | 6.0 | 0.5 |
| 8 | 24.3 | 2.14 | 3.40 | 0.30 | 11.35 | 1.0 |

NOTE.—All percentages and weights are based on a nylon batch weight of 2.5 pounds. All percents are by weight.

TABLE II

Conditions Used for Molding Test Specimens

| | |
|---|---|
| Injection, sec. | 20 |
| Charge, sec. | 2 |
| Dies Cooling, sec. | 30 |
| Dies Open, sec. | 4 |
| Injection Pressure, p.s.i. | 1450 |
| Mold Temperature, °F. | 75 |
| Nozzle, percent | 70 |
| Cylinder Temperature, °F. | |
| Rear | 490 |
| Front | 500 |
| Equipment | |
| Two ounce Van Dorn with four cavity mold. | |

TABLE III.—HEAT STABILITY BEND TEST RESULTS

| Number of days heat aged at 160° C. | Sample Number | | | | | | | | Control |
|---|---|---|---|---|---|---|---|---|---|
| | 1 | 2 | 3 | 4 | 5 | 6 | 7 | 8 | |
| 1 | | | | | | | | | |
| 2 | [1] 2/2 | 3/3 | 3/4 | 5/5 | 5/5 | | | | |
| 3 | | | | | | | 5/5 | 5/5 | 5/5 |
| 4 | 5/5 | 5/5 | 4/5 | | | | | | |
| 5 | | | | 5/5 | 4/5 | 5/5 | 5/5 | 5/5 | 5/5 |
| 6 | 5/5 | 4/5 | 5/5 | 5/5 | 3/5 | 5/5 | | | |
| 7 | | | | | | | 5/5 | 5/5 | 5/5 |
| 8 | 5/5 | 4/5 | 5/5 | 4/5 | 3/5 | 3/5 | | | |
| 9 | | | | 5/5 | 2/5 | 2/5 | 5/5 | 5/5 | 4/5 |
| 10 | 3/5 | 2/5 | 3/5 | | | | | | |
| 11 | | | | | | | 4/5 | 5/5 | 5/5 |
| 12 | 3/5 | 1/5 | 4/5 | 4/5 | 3/5 | 3/5 | | | |
| 13 | | | | 2/5 | 0/5 | 1/5 | 4/5 | 3/5 | 1/5 |
| 14 | 0/5 | 0/5 | 0/5 | | | | | | |
| 15 | | | 0/5 | 0/5 | 0/5 | 0/5 | 2/5 | 0/5 | 1/5 |

[1] Number passed/number tested.

We claim:

1. Discrete, solid particles of thermoplastic polyamide coated with from about 0.1 to about 3.7 weight percent of the cupric salt of a copolymer of an olefin and an unsaturated monocarboxylic acid to protect the polyamide from thermal degradation during melt forming into manufactured articles.

2. The coated particles of claim 1 wherein the olefin is ethylene.

3. The coated particles of claim 2 wherein the cupric salt of the copolymer of ethylene with an unsaturated monocarboxylic acid contains amide carboxylate groups.

4. The coated particles of claim 3 wherein the amide carboxylate is an amide acrylate.

5. The coated particles 4 wherein the amide acrylate is present in the copolymer at a ratio of 65 groups to 35 groups of the cupric salt acrylate.

* * * * *